(12) United States Patent
Sun et al.

(10) Patent No.: US 12,069,720 B2
(45) Date of Patent: Aug. 20, 2024

(54) METHODS FOR SUPPORTING BSS EDGE USER TRANSMISSIONS

(71) Applicant: INTERDIGITAL PATENT HOLDINGS, INC., Wilmington, DE (US)

(72) Inventors: Li Hsiang Sun, San Diego, CA (US); Hanqing Lou, Syosset, NY (US); Alphan Sahin, Westbury, NY (US); Xiaofei Wang, North Caldwell, NJ (US); Rui Yang, Greenlawn, NY (US); Frank La Sita, Setauket, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 263 days.

(21) Appl. No.: 17/610,343

(22) PCT Filed: May 8, 2020

(86) PCT No.: PCT/US2020/032137
§ 371 (c)(1),
(2) Date: Nov. 10, 2021

(87) PCT Pub. No.: WO2020/231825
PCT Pub. Date: Nov. 19, 2020

(65) Prior Publication Data
US 2022/0217770 A1 Jul. 7, 2022

Related U.S. Application Data

(60) Provisional application No. 62/846,183, filed on May 10, 2019.

(51) Int. Cl.
*H04W 74/00* (2009.01)
*H04B 17/318* (2015.01)
(Continued)

(52) U.S. Cl.
CPC ........ *H04W 74/008* (2013.01); *H04B 17/318* (2015.01); *H04W 72/0453* (2013.01);
(Continued)

(58) Field of Classification Search
CPC ........... H04W 74/008; H04W 72/0453; H04W 72/56; H04W 74/006; H04W 74/0866;
(Continued)

(56) References Cited

U.S. PATENT DOCUMENTS

2016/0315792 A1* 10/2016 Rahmati ............... H04B 7/0413
2017/0070961 A1 3/2017 Bharadwaj et al.
(Continued)

FOREIGN PATENT DOCUMENTS

| WO | WO-2017044529 A1 * | 3/2017 | .......... H04W 72/121 |
| WO | 2017/156151 | 9/2017 | |

OTHER PUBLICATIONS

Cariou, "802.11 EHT Proposed PAR," IEEE P802.11 Wireless LANs, IEEE 802.11-18/1231r4 (Jan. 2019).
(Continued)

*Primary Examiner* — Thai Nguyen
(74) *Attorney, Agent, or Firm* — Volpe Koenig

(57) ABSTRACT

Methods and apparatuses for enhancing random access procedures are described herein. A method performed by an access point (AP) may comprise allocating a plurality of random access (RA) resource units (RA-RUs) for transmitting a message from a station (STA) to the AP over an upper or lower frequency band. The method may comprise transmitting, to a station (STA), one or more physical layer convergence procedure (PLCP) protocol data unit (PPDU) over the upper or lower frequency bands. Each of the one or more PPDUs may include a trigger frame, and the trigger frame may include an indication of the plurality of RA-RUs and a target received signal strength indicator (TRSSI)
(Continued)

associated with at least one of the upper or lower frequency bands. The method may comprise receiving, in response to the trigger frame, the message from the STA in one of the plurality of RA-RUs.

20 Claims, 10 Drawing Sheets

(51) Int. Cl.
*H04W 72/0453* (2023.01)
*H04W 72/56* (2023.01)
*H04W 74/08* (2009.01)

(52) U.S. Cl.
CPC ......... *H04W 72/56* (2023.01); *H04W 74/006* (2013.01); *H04W 74/0866* (2013.01)

(58) Field of Classification Search
CPC . H04W 74/0833; H04W 88/08; H04W 88/02; H04W 24/10; H04B 17/318
See application file for complete search history.

(56) References Cited

U.S. PATENT DOCUMENTS

| | | | |
|---|---|---|---|
| 2018/0255570 A1* | 9/2018 | Patil | .................... H04W 74/006 |
| 2019/0007973 A1 | 1/2019 | Lou et al. | |
| 2020/0014599 A1* | 1/2020 | Asterjadhi | ............ H04W 72/21 |

OTHER PUBLICATIONS

Cariou, "IEEE 802.11 EHT draft Proposed CSD," IEEE P802.11 Wireless LANs, IEEE 802.11-18/1233r4 (Jan. 2019).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.1 (Apr. 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

* cited by examiner

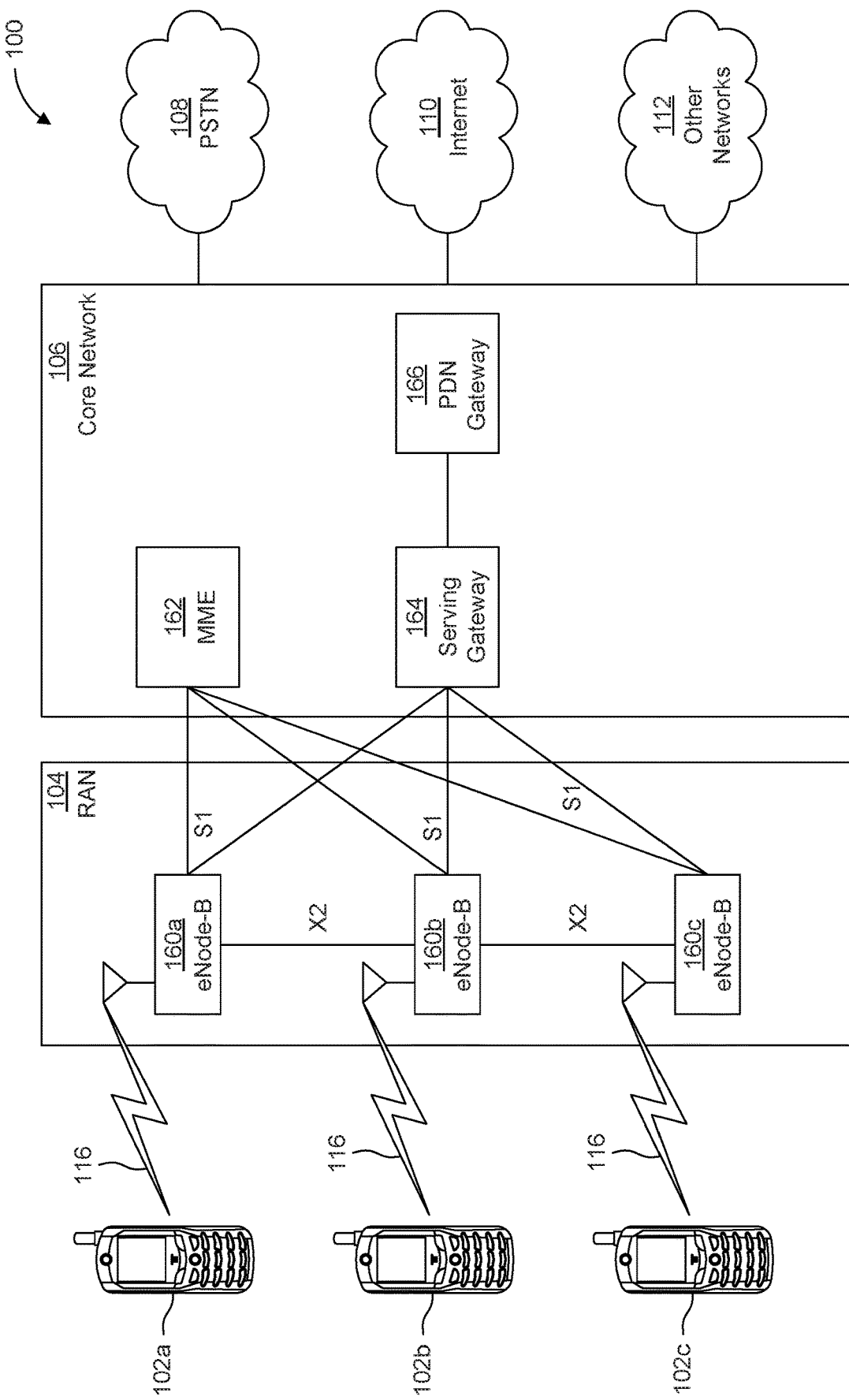

METHODS FOR SUPPORTING BSS EDGE USER TRANSMISSIONS

CROSS-REFERENCE TO RELATED APPLICATIONS

This application is the U.S. National Stage, under 35 U.S.C. § 371, of International Application No. PCT/US2020/032137 filed May 8, 2020, which claims the benefit of U.S. Provisional Application No. 62/846,183, filed May 10, 2019, the contents of which are incorporated herein by reference.

BACKGROUND

In the field of wireless communications, various systems, methods, and devices may be used to enhance and improve wireless communication. For example, protocols such as IEEE 802.11 may provide for Wireless Local Area Network (WLAN) operation involving two or more devices. These protocols may be used worldwide and have many use cases. As new technologies are developed, new protocols may be needed to address the new use cases that these new technologies enable.

A WLAN operated in an Infrastructure Basic Service Set (BSS) mode may include an Access Point (AP) for the BSS and one or more stations (STAs) associated with the AP. The AP may have access to, or interface with, a Distribution System (DS) or another type of wired or wireless network that carries traffic in and out of the BSS. Traffic to STAs that originates from outside the BSS may arrive through the AP and be delivered to the STAs. Traffic originating from STAs and travelling to destinations outside the BSS may be sent to the AP to be delivered to their respective destinations. Traffic between STAs within the BSS may also be sent through the AP; for example, the source STA may send traffic to the AP and the AP may deliver the traffic to the destination STA. Such traffic between STAs within a BSS may be called peer-to-peer traffic. Such peer-to-peer traffic may also be sent directly between source and destination STAs with a direct link setup (DLS) using an 802.11e DLS or an 802.11z tunneled DLS (TDLS). A WLAN using an Independent BSS (IBSS) mode may have no AP and/or no STAs communicating directly with each other. This mode of communication may be referred to as an "ad-hoc" mode of communication.

SUMMARY

Methods and apparatuses for enhancing random access procedures are described herein. A method performed by an access point (AP) may comprise allocating a plurality of random access (RA) resource units (RA-RUs) for transmitting a message from a station (STA) to the AP over an upper or lower frequency band. The method may comprise transmitting, to a station (STA), one or more physical layer convergence procedure (PLOP) protocol data unit (PPDU) over the upper or lower frequency bands. Each of the one or more PPDUs may include a trigger frame, and the trigger frame may include an indication of the plurality of RA-RUs and a target received signal strength indicator (TRSSI) associated with at least one of the upper or lower frequency bands. The method may comprise receiving, in response to the trigger frame, the message from the STA in one of the plurality of RA-RUs.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a system diagram illustrating an example radio access network (RAN) and an example core network (CN) that may be used within the communications system illustrated in FIG. 1A according to an embodiment;

DETAILED DESCRIPTION

Figure 1A:
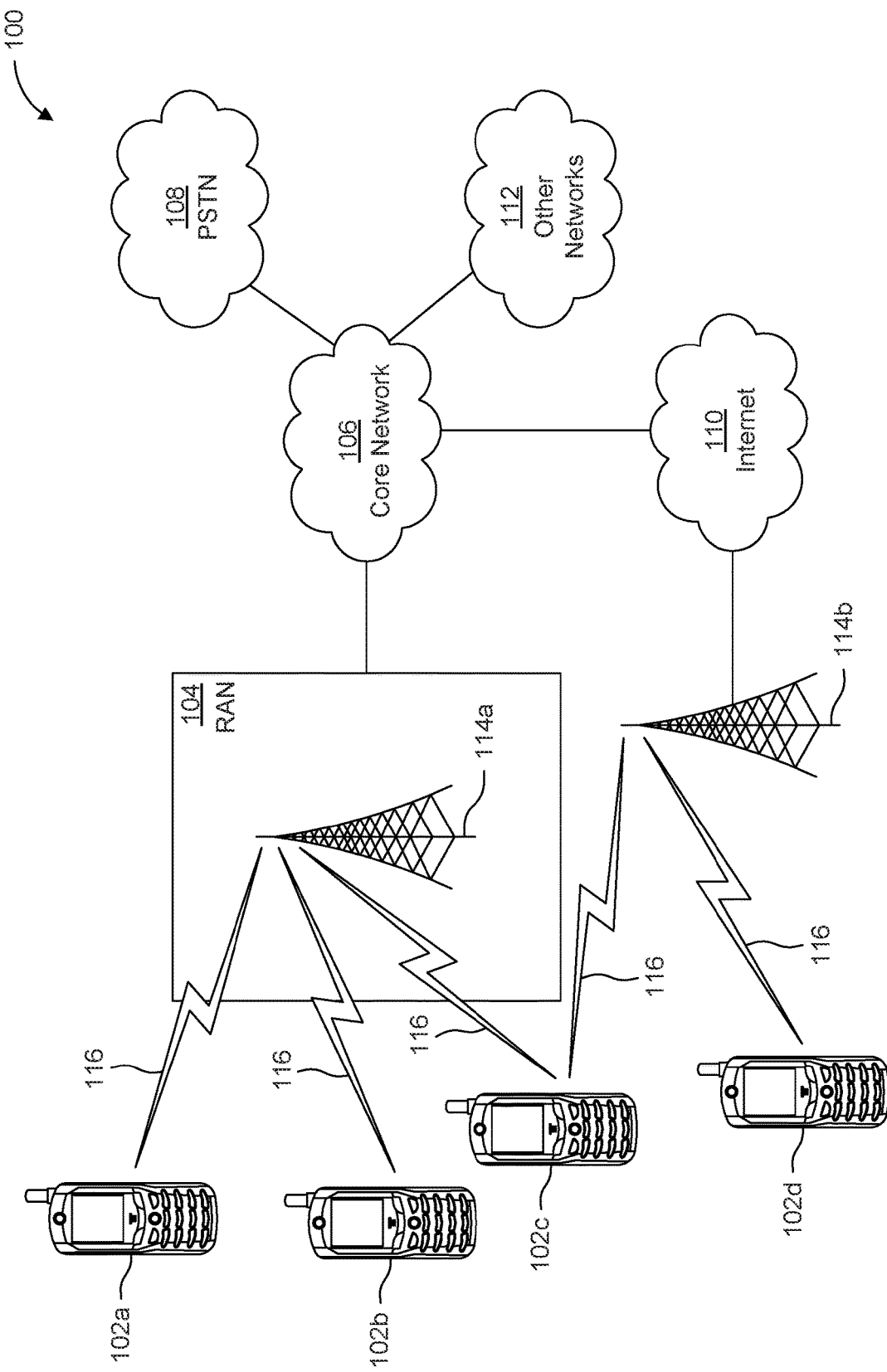
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
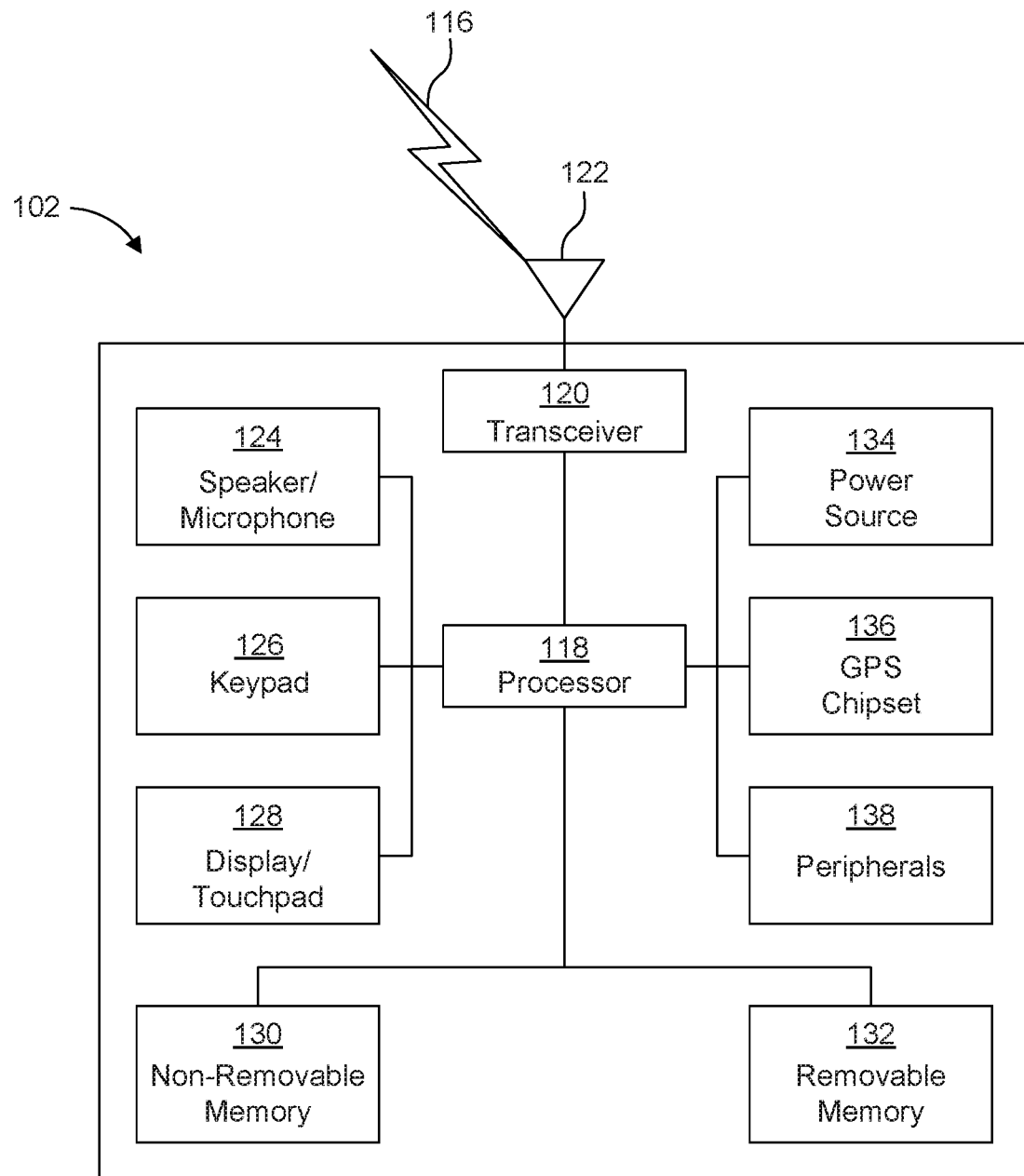
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
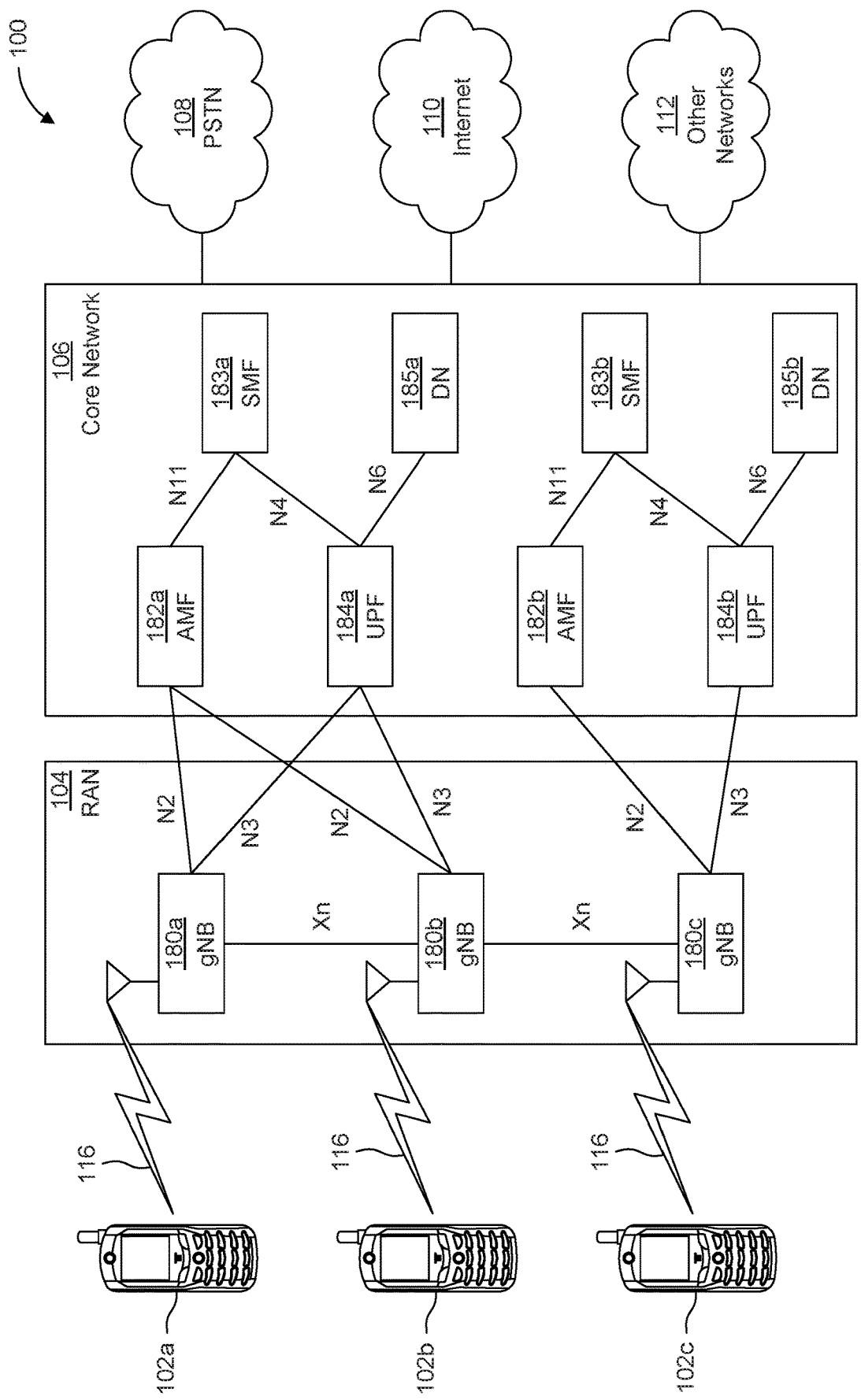
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The IEEE 802.11™ Extremely High Throughput WLAN (EHT) Study Group (SG) has been created to explore the scope and purpose of a possible, future amendment to provide enhanced throughput, enhanced reliability, reduced latency, and jitter and improved power efficiency in many usage scenarios. The IEEE Standard board approved the IEEE 802.11be Task Group (TG) based on a Project Authorization Request (PAR) and Criteria for Standards Development (CSD) developed in the EHT SG. Examples of applications of such improvements to latency, throughput, and spectral efficiency that are to be supported in 802.11be include 4K/8K video, gaming, virtual and augmented reality, remote offices, and cloud computing. In the 802.11be PAR, latency requirements may be imposed since new high-throughput, low latency applications such as the aforementioned may proliferate.

Mechanisms for low latency transmission as implemented in 5G New Radio (NR) and in WLANs are described herein. 5G NR networks may be designed to support three or more categories of service including enhanced mobile broadband (eMBB), massive machine-type communication (mMTC), and ultra-reliable low latency communication (URLLC). Mechanisms and procedures designed for URLLC may provide advanced services for latency-sensitive devices or traffic. Configure-grant transmission may be adopted in 5G NR to reduce the frame exchanges of service requests or responses between fifth generation nodeBs (gNBs) and UEs so that UEs with low latency traffic may communicate over pre-configured resources without requesting transmissions.

In WLANs, STAs may use various types of protocols to transmit information over channels occupied by other STAs. For example, carrier sense multiple access with collision avoidance (CSMA/CA) channel access may be used for multiple access. A STA may perform a transmission without approval from its associated AP when the STA listens to a shared medium for a certain period and determines the medium is free. The channel sensing resolution may be, for example, 20 MHz or above.

In 802.11ax, for example, orthogonal frequency-division multiple access (OFDMA) may be used for both downlink (DL) and uplink (UL) transmissions. Mechanisms and procedures are defined to enable one or more STAs to concurrently transmit in different frequency units. In some circumstances, concurrent UL OFDMA transmissions may be triggered and scheduled by the associated AP. At least two schemes may be supported for low latency transmissions, including UL OFDMA-based Random Access (UORA) for associated and non-associated STAs and Null Data Packet (NDP) feedback report procedures.

In 802.11ax, for example, a STA may perform autonomous uplink transmissions either using traditional CSMA/CA procedure by sensing the entire channel, or using an UORA procedure. An AP may use a trigger frame with a set of resource units over which associated STAs and/or unassociated STAs may transmit uplink traffic. The AP may assign an uplink modulation and coding set (MCS), length, and other related physical layer (PHY) parameters. A STA may use an UORA procedure to determine the resource and transmit a trigger-based physical layer convergence procedure (PLOP) protocol data unit (PPDU). The AP may transmit an acknowledgement, such as a multi-STA block acknowledgement (BA), to the STAs.

Table 1 depicts a format of the trigger frame. As shown, the trigger frame may include a plurality of fields. Each field may have a length which may be expressed, for example, in terms of a number of bits, bytes, octets, or symbols. The fields may include, for example, a recipient address (RA) for a STA, a transmitting address (TA) for a STA, and a frame check sequence (FCS).

TABLE 1

| Trigger Frame in 802.11ax | | | | | | | | | |
|---|---|---|---|---|---|---|---|---|---|
| Field Name | Frame Control | Duration | RA | TA | Common Info | User Info | ... | User Info | Padding | FCS |
| Octets | 2 | 2 | 6 | 6 | 8 or more | 5 or more | | 5 or more | variable | 4 |

Table 2 depicts the Common Info field of the trigger frame described above.

TABLE 2

| Common Info Field in Trigger Frame | | | | | | | |
|---|---|---|---|---|---|---|---|
| Common Info | Trigger Type | UL Length | More TF | CS Required | UL BW | GI and LTF Type | ... |
| Bits | 4 | 12 | 1 | 1 | 2 | 2 | |
| MU-MIMO LTF Mode | # of HE-LTF Symbols and Midamble Periodicity | UL STBC | LDPC Extra Symbol Segment | AP TX Power | Pre-FEC Padding Factor | PE Disambiguity | ... |
| 1 | 3 | 1 | 1 | 6 | 2 | 1 | |
| UL Spatial Reuse | Doppler | UL HE SIG-A2 Reserved | | Reserved | | Trigger Dependent Common Info | |
| 16 | 1 | 9 | | 1 | | variable | |

As shown in Table 3, the User Info fields may provide details as to each of the devices except the NDP feedback report poll (NFRP) trigger.

TABLE 3

User Info Field in Trigger Frame

| User Info (not for NFRP) | AID12 | RU Allocation | UL FEC Coding | UL MCS | UL DCM | SS Allocation/ RA-RU Information | UL Target RSSI | Reserved | Trigger Dependent User Info |
|---|---|---|---|---|---|---|---|---|---|
| Bits | 12 | 8 | 1 | 4 | 1 | 6 | 7 | 1 | variable |

In 802.11ax, for example, transmission of null data packet (NDP) feedback reports (NFR) may be supported. In some embodiments, an AP may transmit a trigger frame, and the trigger frame type, as given for example, in the Common Information, may be an NDP Feedback Report Poll (NFRP). The AP may indicate that the feedback type is a resource request. A starting association ID (AID) field may be included in the trigger frame. In some embodiments, a high efficiency (HE) MU PPDU may not be used to carry an NFRP trigger.

A STA may detect the NFRP trigger and receive scheduling information and parameters for transmitting an NFR. The STA may obtain the NDP Feedback Report parameter, for example, from the management frames. The STA may follow the instructions provided via the NFRP trigger and NDP feedback report parameter to transmit an NFR. In some embodiments, no acknowledgement is sent from the AP to the STA or STAs.

A trigger frame for a NFRP may have the same frame format as shown in Table 1, for example. The Common Info field may be the same as shown in Table 2. However, in some cases, the User Info field may be defined as shown separately in Table 4.

TABLE 4

User Info field in Trigger frame for NFRP trigger

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | variable | 4 |

A STA triggered by an AP may respond with a trigger-based PPDU. An example of a format for the trigger-based PPDU is given in Table 5. Transmissions in response to a UORA trigger may be transmitted with single data stream.

TABLE 5

Trigger-based PPDU defined in 802.11ax

| L-STF | L-LTF | L-SIG | RL-SIG | HE-SIG-A | HE-STF | HE-LTF | ... | HE-LTF | Data | PE |
|---|---|---|---|---|---|---|---|---|---|---|

Challenges related to BSS coverage range and edge user support are presented herein. In uplink OFDMA-based access, one or multiple STAs may need to adjust their transmit powers such that the received powers at the AP side are approximately aligned. In 802.11ax, for example, an AP may include its transmit power, for instance, in the Common Info field of a trigger frame, and/or include a UL target RSSI in the User Info field of a trigger frame.

In OFDMA-based random access procedures, one or multiple STAs may be triggered by a single trigger frame and the one or more STAs may use the same User Info field and perform their respective uplink transmissions. Thus, a single UL target RSSI may be used by multiple STAs to adjust their transmit power. For users operated at the edge of BSS coverage, it is possible that the one or more STAs may be unable to reach the target RSSI even though the one or more STAs use the maximum allowed transmit power. In some cases, this may result in an imbalance in received power at the AP side.

In OFDMA-based random access procedures, non-AP STAs may maintain an internal OFDMA contention window (OCW) and an internal OFDMA back-off (OBO) counter. The OCW may be an integer in a range from a minimum OCW size (OCWmin) to a maximum OCW size (OCWmax). A non-AP HE STA may obtain OCWmin and OCWmax from the most recently received UORA Parameter Set element carried in a beacon, probe response, association response frame, or re-association response frame transmitted by an associated AP.

In OFDMA-based random access procedures, some scenarios may concern a non-AP STA that has a pending frame for the AP and receives a trigger frame containing at least one eligible RA-RU. In such a scenario, if the OBO counter of the STA is not greater than the number of eligible RA-RUs in a trigger frame from that AP, the HE STA may set its OBO counter to zero and randomly select one of the eligible RA-RUs to be considered for transmission. Otherwise, the STA may decrement its OBO counter by the number of eligible RA-RUs in the trigger frame.

Solutions discussed throughout may provide extensions to coverage range extension and enhanced support for edge users. As described herein, the embodiments that follow may address the aforementioned challenges, among others. In some solutions, a newly designed trigger frame and procedure may be used to trigger a STA, a group of STAs, or a subset of a group of STAs satisfying certain criteria to use the random-access resource units (RA-RUs) allocated in the trigger frame. The criteria may include, for instance, one or more channel conditions, a signal-to-noise ratio (SNR), path loss, or bandwidth.

In some embodiments, repetitive transmissions over different time intervals or frequencies, and transmissions over selected resource units (also referred to herein as "selection transmissions") may be performed so that transmissions from cell edge users may be more reliable. In a trigger frame, an AP may specify a repetitive transmission or selection transmission as may be later described herein. In some embodiments, the criteria may be based on a path loss threshold. For example, the RA-RUs may be allocated only to STAs for which a path loss is higher than or equal to a threshold. The criteria may be signaled in the trigger frame as may be consistent with the embodiments described later herein. In some methods, a trigger frame may be used to trigger UL transmissions over multiple bands.

Embodiments directed to repetitive transmission procedures are described herein. In some repetitive transmission procedures, a STA may transmit identical PPDUs on different selected frequency (e.g., RUs) or time (e.g., OFDM symbols) resources. For example, a STA may transmit the same information bits that have been processed into different coded bits and modulated symbols on different frequency and/or time resources.

The MC information and/or the repetition factor may be indicated by the AP through a trigger frame. For example, the STA may use different puncture patterns to select coded bits such that they may differ even among the same set of information bits. An AP may combine the energy of the full set of selected resources or a subset of the selected resources to decode the PPDU. Due to the channel contention, transmissions in RUs from different STAs may partially or fully overlap or collide. In such cases, an AP may discard the information in the resource but only combine energy for the resources in which a collision or collisions have not occurred.

In some embodiments, each of the resources may contain an Extremely High Throughput Signal X (EHT-SIG-X) field. A cyclic redundancy code (CRC) of the EHT-SIG-X field may indicate whether a collision has occurred over the resource or not. An EHT-SIG-X field may contain the locations of resources selected by the STA transmitting on the current resource. For example, an AP may receive an EHT-SIG-X field in a first RU (i.e., RU1) indicating a repetition is to be transmitted on the first RU and a second RU (i.e., RU1 and RU2) from STA1. A third RU (i.e., RU3) may include an EHT-SIG field indicating repetitions are to be transmitted on RU2 and RU3 from STA2. The AP may discard the content of RU2 when decoding STA1 and STA2's PPDUs.

In some embodiments, repetitive transmissions may be performed in the frequency domain. For instance, a STA may select more than one RU and transmit data on each of the selected RUs. The data transmitted on each of the selected RUs may be identical. There may be a minimum distance between selected RUs to satisfy the power spectral density constraint. An AP may indicate the minimum distance—i.e., a frequency distance—between RUs and/or signal an RU selection constraint for the STAs' transmissions. The constraint may limit possible associations between two RUs, a single RU and a subset of RUs, or a subset of RUs and a single RU. For example, an AP may signal that RU3 is associated with RU1 and RU5. If a STA transmits on RU3, it may also transmit on either RU1 or RU5 if it needs to select a second RU, for instance.

In some embodiments, repetitive transmissions may be performed in the time domain. For instance, an AP may allocate an RU with reference to a prior time/frequency resource in which a collision has occurred. Only the STA or STAs transmitting over the specified the time/frequency resource may use the subsequent RU allocation. In a first RU, RA-RU1, at time $t_1$, an AP may decode an EHT-SIG-X of a random access transmission from a STA but may be unable to decode the data carried in the PPDU because of a collision or another reason, such as fading. The AP may indicate through another trigger frame, for example, the RU (e.g., RU1, $t_1$) or the STA's ID if also carried in the EHT-SIG-X. The AP may therefore assign a resource in which the STA may retransmit the PPDU.

In another example involving first and second STAs, in RA-RU1 at time $t_1$, STA1 and STA2 may perform a transmission. The AP may be unable to decode the transmissions from either the first or second STAs. The AP, via a later trigger frame, may reference the resource (e.g., RU1, $t_1$) and assign N>1 resources in which only STAs that have previously transmitted on RU1 at $t_1$ (i.e., STA1 and STA2) may use a subset of N resources to retransmit.

Embodiments directed to the repetitive transmission configuration are described herein. In some embodiments, the number of repetitions transmitted per STA may be fixed or configurable. One or more methods as follows may be implemented. In some methods, the number of repetitions may be predefined. For instance, the number of repetitions may be predetermined by the AP, and the AP may signal the predetermined number of repetitions to the STA or STAs in a control or management frame, such as a trigger frame. In some methods, the number of repetitions may depend on the traffic type. For example, traffic with a low latency requirement may be allowed to have a greater number of repetition transmissions. This may be facilitated, for example, by using multiple RUs. Traffic having a high reliability requirement may be allowed to have a greater number of repetition transmissions. The mapping between traffic type/QoS parameters and the number of repetition transmissions allowed may be predefined, predetermined, or signaled to the STA or STAs by the AP. A STA may determine the number of repetition transmissions by checking its traffic type and the corresponding mapping.

In some methods, the number of repetition transmissions may depend on pathloss and target RSSI. For example, when using maximum transmit power, the STA may not achieve the target UL RSSI, and the STA may be allowed to perform one or more repetition transmissions. In some methods, the number of repetition transmission that may be performed may be depend on the amount by which the estimated receive power falls below the target. For example, if the estimated receive power at the AP side is 3 dB below the UL target RSSI (or within 3 dB), the STA may be allowed to perform two repetition transmissions. In another example, if the estimated receive power at the AP side is 6 dB below the UL target RSSI (or within 6 dB), the STA may be allowed to perform four repetition transmissions.

Embodiments directed to RU selection transmissions are described herein. When an OFDMA back-off (OBO) counter is not greater than the number of eligible RUs, an RU may be selected at random among eligible RUs for transmission. In other embodiments, the transmission RU may be selected based on the channel condition in order to satisfy the Target RSSI indicated by the AP. The channel condition may be based on one or more channel measurements on an RU, for example, such as reference signal received power (RSRP), or one or more of the largest singular values based on singular value decomposition of the channel on a RU.

In an example scenario, a STA may, upon receiving a trigger frame, rank M eligible RA-RUs based on the channel condition from best to worst, 1, . . . , M. The STA may perform a series of N retransmissions. In a first transmission, the STA may randomly select an RU among eligible RUs whose corresponding ranks are in set $S_1$. The STA may perform a selection from a different set, which may be a superset of $S_1$, for subsequent retransmissions. For example, in the (N−1)th retransmission, the STA may randomly select an RU among from eligible RUs whose corresponding ranks are in set $S_N$. For example, in the first transmission, the STA may select an RU with the best channel condition to minimize error. If the first transmission fails, the STA may select an RU from a set of RUs that includes the best RU and the second best RU. This may be to avoid the scenario where two STAs select an RU as the best RU and experience collision again during the retransmissions. The rank of RUs may or may not change in each of the retransmissions, depending on the degree of Doppler shift and spread. The value of M may be different for each retransmission, depending on the number of eligible resources or RUs in allocated for each retransmission.

In one example, where $s_1=\{1\}$, $s_2=\{2\}$, ..., an RA-STA may choose the best RU for the initial transmission and chooses the second best RU for the first retransmission. In another example, where $s_1=\{1\}$, $s_2=\{1, 2, 3\}$, an RA STA may choose the best RU for the initial transmission and may randomly pick, based on a ranking for example, one of the best, second best, or third best RUs for the first retransmission.

Embodiments directed to performing channel measurements based on a PPDU carrying a trigger frame are described herein. In some embodiments, a trigger frame may be sent to more than one STA. In order to avoid unintended beamforming, Cyclic Delay Diversity (CDD) may be used for an AP with multiple antennas sending a PPDU with a single stream. The method in previous sections may require a STA to estimate channel conditions on different RUs. For a non-AP STA using a single antenna, CDD may result infrequency-selective fading. This may prevent the STA from estimating the channel condition correctly as the STA may not exploit channel reciprocity.

For a non-AP STA using multiple antennas, CDD with single stream transmission may prevent the STA from estimating the channel, performing an SVD decomposition of the estimated channel, and using the result of the decomposition to precode a beam-formed transmission. To address the issue, the PPDU carrying the trigger frame may have more than one channel estimation sequence, and the number of sequences may correspond to the number of antennas at the AP. For example, LTF sequences that each may correspond to a transmit antenna of the AP may be added to the PPDU carrying the trigger frame. This may apply to a PPDU sent with a single spatial stream or with CDD. For decoding the PPDU carrying the trigger frame, single-stream channel estimation for each receiving antenna may be performed by combining the channels estimated from all the sequences at the receiving antenna.

Embodiments directed to adjustment of target RSSI levels are described herein. In some methods, a subfield in the User Info field may be defined to indicate that an UL target RSSI must be satisfied. For example, the new subfield may be a one-bit field named "Target RSSI Mandate." In some configurations, STAs that are unable to achieve the UL target RSSI may be unable, or may lack permission, to transmit. A dedicated trigger may be indicated, for example, when the AID12 subfield in the User Info field is not 0 or 2045. In such a case, the AP and STA procedure may proceed as follows. Based on a priori information, an AP may know the pathloss of a STA. The AP may group the STA with other STAs having similar pathloss and send a trigger frame to trigger UL transmissions by the group of STAs. The AP may set the UL target RSSI based on its estimated pathloss. In one method, the group of STAs may be identified by a group AID, which may be carried in the AID12 field. Both AP and STAs may know this group AID prior to the trigger-based transmission. For example, the AP may assign the group AID to the group of STAs in a control frame, management frame, or data frame.

A STA whose AID matches the AID12 subfield in the trigger frame may estimate whether it is able to achieve the UL Target RSSI carried in the trigger frame. The STA may check whether the Target RSSI Mandate field is set. If the Target RSSI Mandate field is set, and the STA is able to achieve the UL Target RSSI, the STA may adjust its transmit power and perform a transmission in the allocated RU or RUs. If the Target RSSI Mandate field is set, and the STA is unable to achieve the UL Target RSSI, the STA may not transmit in the allocated RU or RUs. In an alternative method, the STA may transmit only the PLOP header at its maximum transmit power or a power which may produce an RSSI that is closest to the Target RSSI in the entire bandwidth or the allocated RU or RUs, such that the AP may know implicitly that the STA may not achieve the target RSSI. The AP may use the PLOP header transmitted in the assigned RUs to estimate the pathloss for the STA, assuming the STA transmitted using maximum power.

If the Target RSSI Mandate field is not set, and the STA is able to achieve the UL Target RSSI, the STA may adjust its transmit power and transmit in the allocated RU or RUs. If the Target RSSI Mandate field is not set, and the STA may not achieve the UL Target RSSI, the STA may use its maximum transmit power or a power that may produce an RSSI that is closest to the Target RSSI and transmit in the allocated RU or RUs. In some cases, the AP may not receive the uplink transmission and may regroup the STA or STAs based on a lower RSSI level. The AP may lower the UL Target RSSI in a following trigger frame. In some embodiments, the AP may have recorded an estimated RSSI for all associated STAs in a table, and the AP may update the table frequently.

A random trigger may be indicated, for example, where the AID12 subfield in the User Info field is 0 or 2045. In such cases, the AP and STA procedure may proceed as described in the following embodiments. In some examples, the AP may prepare a set of trigger frames sequentially in time. The AP may prepare a set of UL Target RSSIs with descending order. In a first trigger frame of the sequence, the AP may use the first UL Target RSSI. The AP may set the Target RSSI Mandate subfield in all the trigger frames of the sequence. The AP may use a field to indicate that the trigger frame is part of the trigger frame sequence.

A STA that is permitted to perform UL OFDMA-based random access (also referred to as an RA-STA) may check whether it has transmitted a response to any trigger frame in the trigger frame sequence. If so, the STA may not transmit anything. If not, the STA may estimate whether it may achieve the UL Target RSSI carried in the trigger frame. If the STA is able to achieve the UL Target RSSI, the STA may adjust its transmit power and perform the transmission in the allocated RU or RUs. If the STA is unable to achieve the UL Target RSSI, the STA may not transmit in the allocated RU or RUs. In an alternative method, the STA may transmit only the PLOP header at its maximum transmit power or a power that may produce an RSSI that is closest to the Target RSSI in the entire bandwidth or the allocated RU or RUs, such that the AP may know implicitly that the STA is unable to achieve the target RSSI. The AP may use the PLOP header transmitted in the assigned RUs to estimate the pathloss for the STA assuming the STA transmitted the PLOP header at maximum power. The AP may continue transmitting the next trigger frame in the sequence with the next corresponding UL Target RSSI.

Embodiments directed to implementations involving multi-band trigger frames (MBTF) are described herein. In some solutions, a trigger frame may allocate RA-RUs in, an upper band, such as the 5/6 GHz band, and a lower band, such as 2.4 GHz band, though RA-RUs may conceivably be allocated in any other valid bands. The PPDU or PPDUs carrying the trigger frame may occupy upper and lower band channels for channel/pathloss estimation by the non-AP STAs for different bands.

In some embodiments, each RA-STA may calculate a maximum expected RSSI in the upper band (ERSSI) at the AP based on the pathloss estimation in upper band and its maximum transmit power. If the ERSSI is less than a target RSSI in the upper-band (TRSSI) indicated in the trigger frame for a STA that uses time sensitive applications (e.g., applications with low-latency requirements such as online games), the STA may have priority in selecting RUs in the 2.4 GHz band. If the STA is able to meet the TRSSI, then it may only have a fraction, x, of total lower band RUs as eligible RUs. The difference between the ERSSI and the TRSSI may be the power headroom in the upper band. Even if the power headroom in the upper-band is positive, a STA with a small headroom may still need to utilize lower band RUs because of power amplifier non-linearity. For example, the number of eligible lower-band RA-RUs, or a fraction x of the total lower-band RA-RUs, may be defined by a function, $f_1$. As described herein, $f_1$ may be a function of the ERSSI, the TRSSI, a combination of the ERSSI and TRSSI as power headroom, priority, MCS, the number of RA-RUs in the upper band, the number of RA-RUs in the lower band, or another metric.

Figure 2:
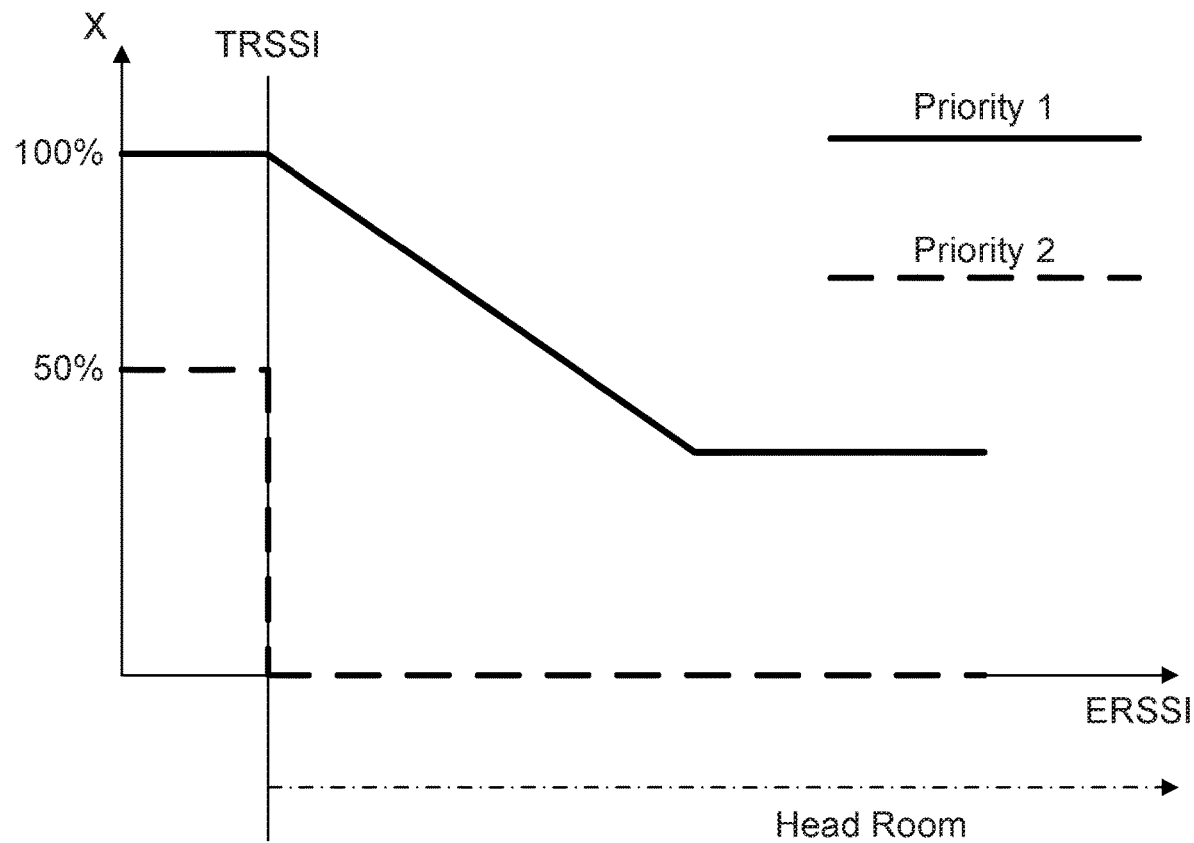
FIG. 2 is an example representation of the eligible RUs in a lower frequency band for each of two classifications of STAs.

FIG. 2 is an example representation of the eligible RUs for each of two classifications of RA-STAs. As shown, RA-STAs may be associated with either one of priorities 1 or 2, where STAs associated with priority 1 may have greater access to lower band RUs than do STAs associated with priority 2. The available proportion, fraction, or percentage, x, of the total lower-band RUs may vary depending on the power headroom, the TRSSI, and the calculated ERSSI. Where the power headroom is low or negative, such that the ERSSI for a STA does not exceed the TRSSI, the proportion of available lower-band RUs may be greater. Where the power headroom for a STA is such that ERSSI meets or exceeds the TRSSI, the proportion of available lower band RUs may decrease such that priority 2 STAs have fewer available lower band RUs, or no available lower band RUs. Similarly, priority 1 STAs whose power headroom is such that ERSSI meets or exceeds the TRSSI may have fewer available lower band RUs, but a greater number of available lower band RUs than priority 2 STAs whose ERSSI exceeds the TRSSI.

Likewise, another function, $f_2$, may be used to designate a proportion, fraction or percentage, y, of upper-band RUs as eligible RUs. For example, if the power headroom in the upper-band is less than or equal to 0, y may be equal to 0. As described herein, $f_2$ may be a function of the ERSSI the TRSSI, a combination of the ERSSI and TRSSI as power headroom, priority, MCS, the number of RA-RUs in the upper band, the number of RA-RUs in the lower band, or another metric.

Figure 3:
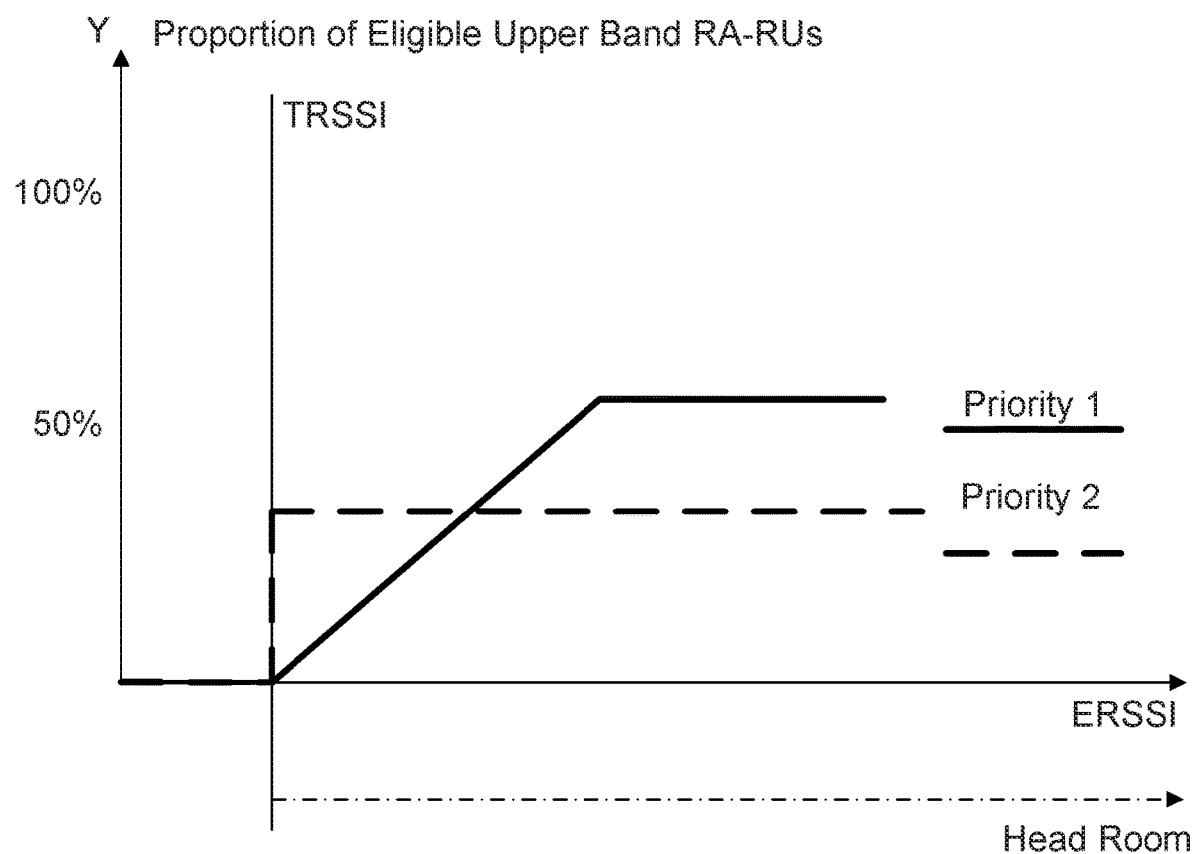
FIG. 3 is an example representation of the eligible RUs in an upper frequency band for each of two classifications of STAs.

FIG. 3 is an example representation of the eligible RUs for each of two classifications of RA-STAs. Similarly as above, RA-STAs may be associated with either one of priorities 1 or 2. Where the power headroom is low, such that the ERSSI for a STA does not exceed the TRSSI, neither priority 1 nor priority 2 STAs may have access to higher band RUs. Where the power headroom for a STA is such that ERSSI meets or exceeds the TRSSI, the proportion of available higher band RUs may increase such that STAs have a greater proportion of available higher band RUs. Priority 1 STAs whose power headroom is such that ERSSI meets or exceeds the TRSSI may have increasing access to higher band RUs as power headroom increases, while priority 2 STAs may have a constant proportion of available higher band RUs regardless of the amount by which ERSSI exceeds TRSSI.

The total number of eligible RUs in the lower band may be expressed as $$N_l = f(N_{lower}, x) \qquad \text{Equation 1}$$

where $N_{lower}$ is the total number of lower band RA-RUs a STA may be permitted to access. Similarly, the total number of eligible RUs in the upper band may be expressed as $$N_u = f(N_{upper}, y) \qquad \text{Equation. 2}$$

where $N_{upper}$ is the total number of upper band RA-RUs the STA may be permitted to access. In both equations, f may be an integer conversion function such as ceiling or floor. Once x and y are determined, the exact location of eligible RUs may be selected at random from the total RA-RUs in each band based on $N_l$ and $N_u$, i.e., selecting randomly $N_l$ out of $N_{lower}$ RUs and/or selecting randomly $N_u$ out of $N_{upper}$ RUs as a set of eligible RUs. Alternatively, eligible RUs may be selected based on channel condition of one or more RUs. For example, when determining lower band eligible RUs, the best $N_l$ RA-RUs in terms of pathloss that the STA is allowed to access may be selected as eligible RUs in the lower band. Then, the STA may follow the current OBO counter decrement rules as described in paragraphs above to perform back-off procedures when an OBO counter is greater than the number of eligible RUs, or to select the final transmitting RU from the eligible RUs when an OBO counter is not greater than the number of eligible RUs.

Figure 4A:
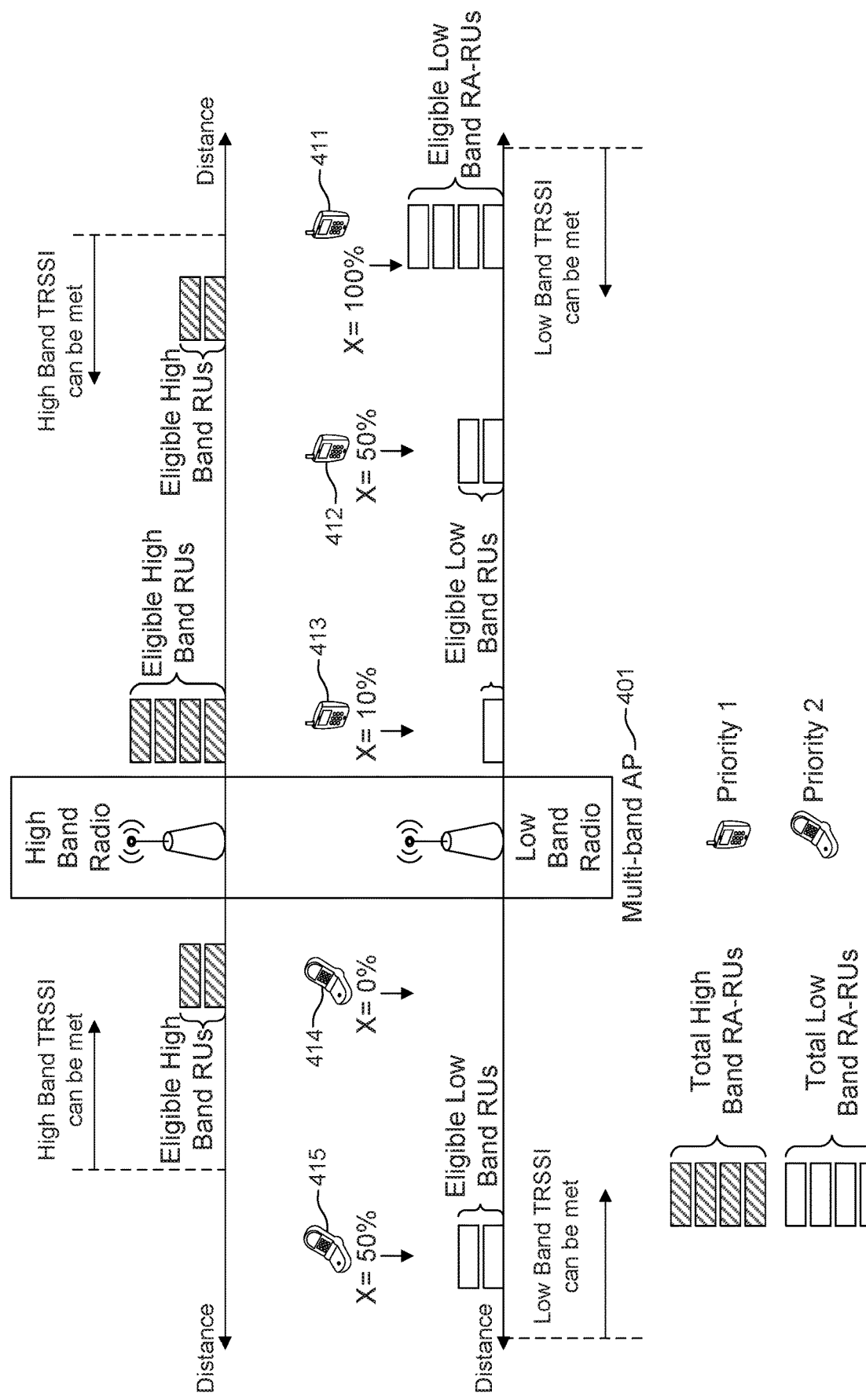
FIG. 4A depicts another illustration of a multi-band trigger frame embodiment involving five STAs and a multi-band AP 401.

FIG. 4A depicts another illustration of a multi-band trigger frame embodiment involving five STAs 411, 412, 413, 414, and 415 and a multi-band AP 401. STAs 411, 412, 413, 414, and 415 may be located at varying distances from the multi-band AP 401, as shown by their respective positions relative to AP 401. STAs 411, 412, and 413 are priority 1 STAs, while STAs 414 and 415 are priority 2 STAs. As shown, eligible RUs for each STA are determined separately for high and low bands. The distance at which a STA may be able to achieve the low band TRSSI may be greater than the distance at which a STA may be able to achieve the TRSSI. For example, STAs 411 and 415 may be able to achieve the TRSSI for low band RUs, but unable to achieve the TRSSI for the high band RUs. As STA 411 is a priority 1 STA, it may have access to a greater number of low band RUs than STA 415, a priority 2 STA. Conversely, STAs 413 and 414, which may be located at a lesser distance to AP 401, and may have a greater proportion of the total high band RUs be made available. In this example, the STAs 411 and 415 may only monitor transmissions from the AP over the lower band due to the limited coverage.

Figure 4B:
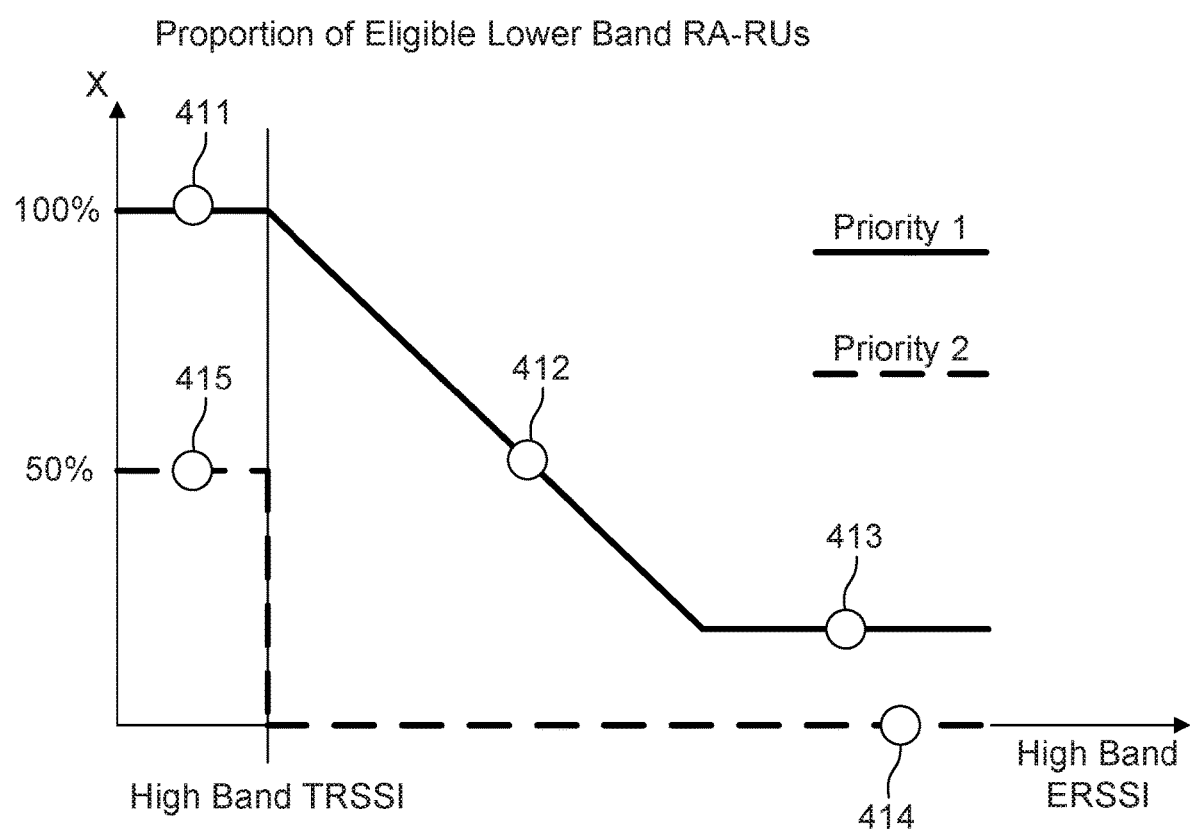
FIG. 4B is a depiction of the lower band RA-RU eligibility for multiple STAs relative to a high band TRSSI.

FIG. 4B portrays the lower band RA-RU eligibility for STAs 411, 412, 413, 414, and 415 relative to the high band TRSSI. As stated above, STAs 411 and 415 may be unable to meet the TRSSI for high band RUs, and accordingly may be provided greater access to low band RUs. STAs 412, 413, and 414, which are able to exceed the TRSSI for high band RUs, may overall have access to fewer low band RUs. Priority 1 STAs 412 and 413 may have greater access to low band RUs than priority 2 STA 414.

Figure 5:
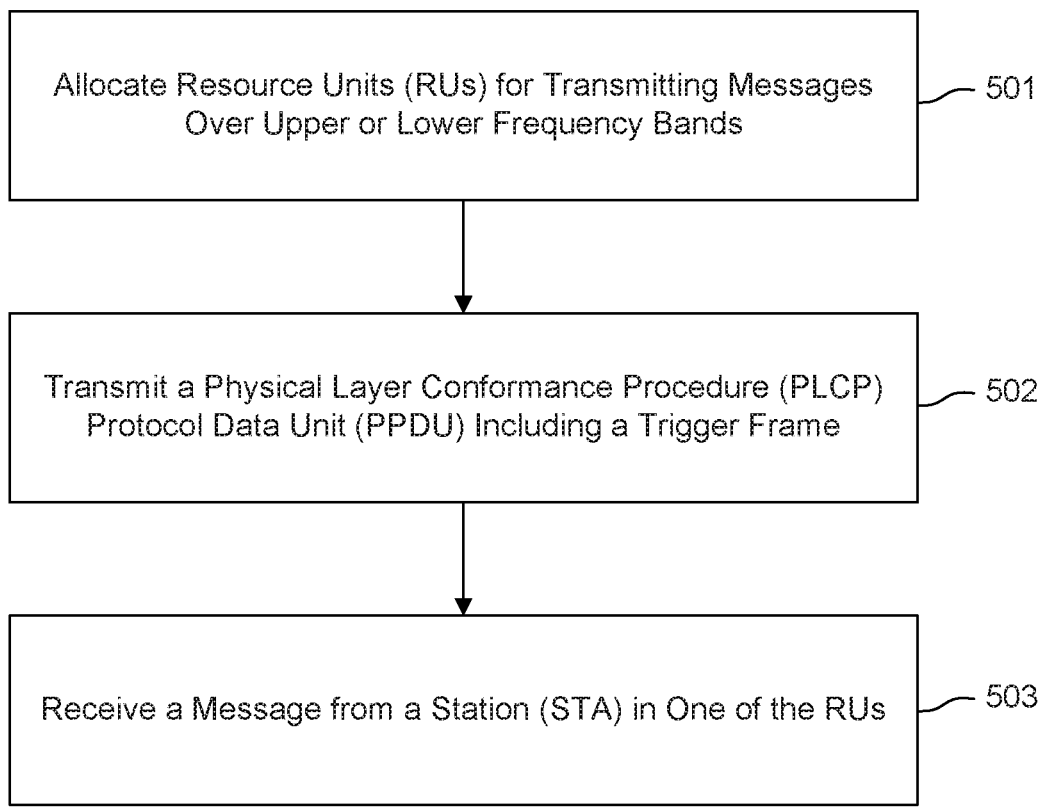
FIG. 5 depicts an example method by which an AP may optimize allocation and selection of RA-RUs within multiple bands.

FIG. 5 depicts an example method by which an AP may optimize allocation and selection of RA-RUs within multiple bands. At 501, the AP may allocate a number of low band RUs and a number of high band RUs to be used by one or more STAs for random access. The low band RUs may be used by STAs in a larger coverage area, while the high band RUs may be used by STAs in a relatively smaller coverage area. The number of RUs available for each STA may depend on one or more metrics such as an ERSSI, power headroom, TRSSI, priority, MCS, or the number of RUs overall in the low and upper bands. At 502, the AP may transmit PLOP protocol data units (PPDUs), which may include the trigger frames at high and low bands indicating the allocated RUs. The trigger frames may also include for instance, one or more of the TRSSI, a priority level corresponding to one or more STAs, an identifier field associated with one or more STAs or identities indicating associated or unassociated random access. The PPDUs may include one or more channel estimation sequences corresponding to transmit antennas of the AP. The trigger frames may be carried in PPDUs over one or both of the low and high bands, and PPDUs may or may not be transmitted exactly at the same time. At 503, the AP may receive a message from one or more STAs. The message may be a random access message such that the STA seeks to complete a random access procedure, or the message may be, for example, an indication that the STA cannot achieve the TRSSI.

Figure 6:
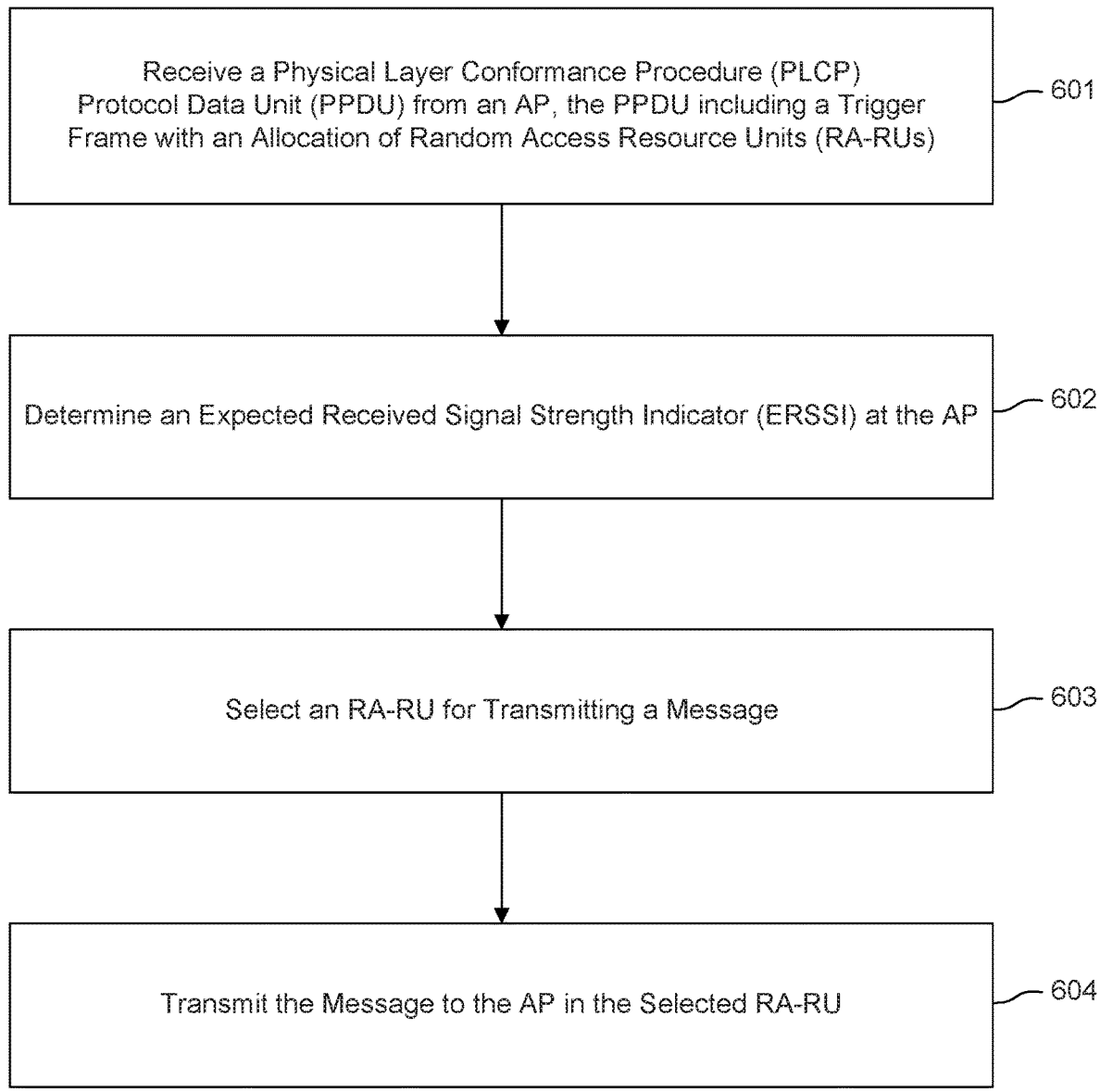
FIG. 6 is a corresponding example of a method that may be performed by a STA for using and selecting the allocated RA-RUs.

FIG. 6 is a corresponding example of a random access method performed by a STA. At 601, the STA may receive PPDUs including trigger frames from an AP. The trigger frames may indicate a number of low band RUs and a number of high band RUs in which to transmit a message over upper or lower frequency bands. The trigger frame may include a TRSSI corresponding to the upper or lower band. Upon receiving the trigger frame, at 602, the STA may perform pathloss estimation for the low and/or high bands. The STA may calculate a corresponding ESSRI at the AP. The STA may determine a power headroom for transmitting a random access message or messages. At 603, the STA may select, based on the ERSSI, TRSSI, and power headroom, an RU from the low band or high band in which to transmit the random access message or messages. The STA may determine, for example, whether it is capable of meeting the TRSSI based on the determined power headroom. At 604, the STA may transmit the message over the selected RA-RU in the low band or high band RU.

Due to wireless medium busy conditions being different among different channels or bands, an AP may not be able to send PPDUs carrying trigger frames on high and low bands at the same time. In this situation, the AP may provide an indication in an earlier trigger frame to indicate to a STA or STAs that, in another band, the STAs will soon receive another trigger frame. This may prevent the STA from making back-off and random access decisions solely based on the resource or TRSSI assigned in the band in which the earlier trigger frame was received. For example, in a case where enhanced distributed channel access (EDCA) procedures are used, a trigger frame in a first band (i.e., a 2.4 GHz band) may be sent first and a trigger frame in a second band (i.e., a 5 GHz band) may be sent later. In the 2.4 GHz trigger frame for example, the AP may indicate that another trigger frame will be transmitted in the 5 GHz band, and the STA or STAs may need to evaluate the 5 GHz channel conditions to determine whether they should access the 2.4 GHz RA-RUs. If the channel condition permits a STA to perform random access in the 5 GHz band, the STA may wait for the 5 GHz trigger frame to perform access and to provide more access opportunities for other STAs located in poorer coverage areas to perform access over the 2.4 GHz band. In addition, the earlier trigger frame in the first band may indicate the TRSSI, the number of RA-RUs, or the MCS to be assigned for RA-RUs in the trigger frame that is sent later in the second band. A STA that monitors and receives on both bands may maintain measurements of the AP's RSSI at both bands. Based on the information from earlier trigger frame at the first band, the STA may use procedures as described in previous paragraphs to determine whether its access should be performed in either the lower or the higher band, or neither for example in the event an OBO counter is greater than the combined eligible RUs in both bands.

Although the solutions described herein may consider 802.11-specific protocols, it is understood that the solutions described herein are not restricted to this scenario and are applicable to other wireless systems as well. In addition, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) comprising:
   a receiver configured to receive, from an access point (AP), one or more physical layer convergence procedure (PLCP) protocol data units (PPDUs) over at least one of an upper or lower frequency band, each of the one or more PPDUs comprising a trigger frame, wherein the trigger frame includes an allocation of random access (RA) resource units (RA-RUs) and at least one target received signal strength indicator (TRSSI), wherein each of the RA-RUs and the at least one TRSSI are associated with one of the upper or lower frequency bands;
   a processor configured to select an allocated RA-RU associated with one of the upper or lower frequency bands based on a priority level associated with the STA, the received at least one TRSSI, and at least one expected received signal strength indicator (ERSSI) at the AP, wherein each of the at least one ERSSI is associated with one of the upper or lower frequency bands; and
   a transmitter configured to transmit, to the AP, a message in the selected RA-RU.

2. The STA of claim 1, wherein the message is transmitted over the lower frequency band.

3. The STA of claim 1, wherein the processor is configured to select an allocated RA-RU on a condition at least one ERSSI associated with the upper frequency band is less than a received at least one TRSSI associated with the upper frequency band.

4. The STA of claim 1, wherein the processor is configured to select an allocated RA-RU on a condition at least one ERSSI associated with the upper frequency band is less than a received at least one TRSSI associated with the upper frequency band.

5. The STA of claim 1, wherein the trigger frame is a first trigger frame, and wherein the selection is based on information included in the first trigger frame indicating a second trigger frame is to be received subsequently over a different frequency band.

6. The STA of claim 1, wherein the at least one of the one or more PPDUs further includes a channel estimation sequence, and the receiver and the processor are configured to decode the channel estimation sequence and perform a pathloss measurement based on the received channel estimation sequence.

7. The STA of claim 1, wherein the message transmitted to the AP is an indication the STA cannot achieve the at least one TRSSI.

8. The STA of claim 7, wherein the at least one TRSSI is a first at least one TRSSI and wherein the transceiver is further configured to receive, in response to the message transmitted to the AP, another trigger frame including a second at least one TRSSI.

9. The STA of claim 1, wherein the trigger frame includes an identifier field associated with the STA.

10. The STA of claim 1, wherein the trigger frame includes information indicating the priority level associated with the STA.

11. A method performed by a station (STA) comprising:
receiving, from an access point (AP), one or more physical layer convergence procedure (PLCP) protocol data units (PPDUs) over at least one of an upper or lower frequency band, each of the one or more PPDUs comprising a trigger frame, wherein the trigger frame includes an allocation of random access (RA) resource units (RA-RUs) and at least one target received signal strength indicator (TRSSI), wherein each of the RA-RUs and the at least one TRSSI are associated with one of the upper or lower frequency bands;
selecting an allocated RA-RU associated with one of the upper or lower frequency bands based on a priority level associated with the STA, the received at least one TRSSI, and at least one expected signal strength indicator (ERSSI) at the AP, wherein each of the at least one ERSSI is associated with one of the upper or lower frequency bands; and
transmitting, to the AP, a message in the selected RA-RU.

12. The method of claim 11, wherein the message is transmitted over the lower frequency band.

13. The method of claim 11, further comprising selecting an allocated RA-RU on a condition at least one ERSSI associated with the upper frequency band is less than a received at least one TRSSI associated with the upper frequency band.

14. The method of claim 11, wherein the processor is configured to select an allocated RA-RU on a condition at least one ERSSI associated with the upper frequency band is less than a received at least one TRSSI associated with the upper frequency band.

15. The method of claim 11, wherein the trigger frame is a first trigger frame, and wherein the selection is based on information included in the first trigger frame indicating a second trigger frame is to be received subsequently over a different frequency band.

16. The method of claim 11, wherein the at least one of the one or more PPDUs further includes a channel estimation sequence, and the receiver and the processor are configured to decode the channel estimation sequence and perform a pathloss measurement based on the received channel estimation sequence.

17. The method of claim 11, wherein the message transmitted to the AP is an indication the STA cannot achieve the at least one TRSSI.

18. The method of claim 17, wherein the at least one TRSSI is a first at least one TRSSI and wherein the transceiver is further configured to receive, in response to the message transmitted to the AP, another trigger frame including a second at least one TRSSI.

19. The method of claim 11, wherein the trigger frame includes an identifier field associated with the STA.

20. The method of claim 11, wherein the trigger frame includes information indicating the priority level associated with the STA.

* * * * *